Oct. 11, 1955  G. L. GOODFELLOW  2,720,145
LENS CARRIER FOR PHOTOGRAPHIC CAMERAS
Filed Nov. 22, 1954  2 Sheets-Sheet 1
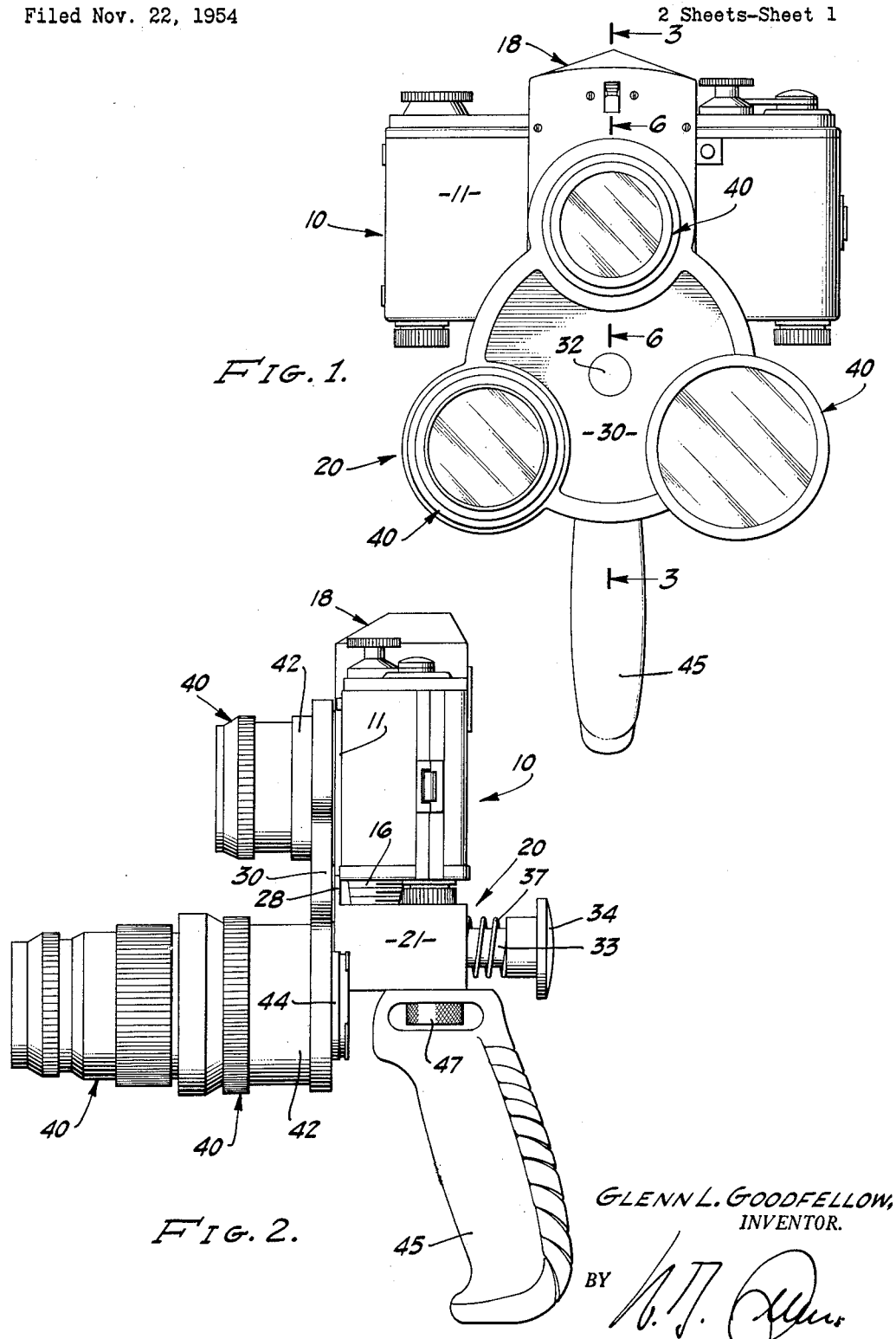

Oct. 11, 1955  G. L. GOODFELLOW  2,720,145
LENS CARRIER FOR PHOTOGRAPHIC CAMERAS
Filed Nov. 22, 1954  2 Sheets-Sheet 2

GLENN L. GOODFELLOW,
INVENTOR.

BY
ATTORNEY.

United States Patent Office 2,720,145
Patented Oct. 11, 1955

2,720,145

LENS CARRIER FOR PHOTOGRAPHIC CAMERAS

Glenn L. Goodfellow, China Lake, Calif.

Application November 22, 1954, Serial No. 470,322

8 Claims. (Cl. 95—45)

The present invention relates to camera lens mountings in general and particularly to a lens turret construction for a photographic camera of the type in which a plurality of lenses are carried for selective seating relative to the camera. More specifically the invention comprises a lens turret unit which includes a rotatable carrier plate carrying a plurality of arcuately spaced lenses selectively movable into alignment with the camera, a body upon which the camera and the carrier plate are mounted and which is, in a preferred embodiment, supported by a pistol grip, the lens-releasing means being so constructed and positioned as to be operable by the hand enclosing the pistol grip.

The skilled photographer frequently finds it desirable and even necessary to change lenses in order to obtain a desired photographic result. The camera lens is usually secured movably as by bayonet slot relationship, and this shifting of lenses is cumbersome requiring as it does the detachment of one lens and its removal and replacement by another from a stored position. This manner of lens shifting has obvious disadvantages in that the time requirement is relatively great causing frequently a desirable picture to be lost. Also the removal and shifting of lenses can result in one or the other of the lenses being dropped with resulting damage. Shiftable lens turrets have been provided for cameras incorporating two or more lenses but they have been of a type in which the displacement and substitution of lenses has been a care-requiring, two-handed job usually necessitating the displacement of the camera to a supporting surface, or at least completely from operative position.

In the lens turret construction of the present invention, which finds particular usefulness in cameras in which the camera lens is the viewing lens, it is possible to shift lenses with one hand without changing the position of the other hand upon the supporting pistol grip and without lowering the camera from the eyes of the photographer. This enables the change to be made with maximum speed and minimum loss, and without loss of the alignment of the camera with the object to be photographed. The lens mounting comprising the present invention is not solely limited to use in connection with a pistol grip support, however, but does find a peculiar advantage when so combined.

It is an object of the present invention to provide a new and improved lens turret unit for photographic cameras in which a plurality of lenses are selectively adjustable to operative position upon being manually released by the actuation of means positioned rearwardly of the camera proper.

A further object of the invention is to provide an improved lens turret construction in which a carrier plate upon which a plurality of lenses are mounted is rotatable upon a body which carries the camera and from which extends a lens-release member to a point spaced rearwardly from the carrier plate.

Still another object of the invention is to provide a lens turret construction in which a plurality of lenses are selectively movable into sealed relationship with a camera unit from which sealed relationship they are displaceable by means of a manually operable plunger.

Still another object of the invention is to provide in combination with a camera a lens turret construction in which a plurality of lenses are mounted upon a rotatable carrier plate for movement into selective cooperative relationship with a camera, the carrier plate being displaceable axially with respect to the major axis of the lenses under the actuating force of a manually operable plunger extended to the rear of the camera.

A further object of the invention is to provide a camera and lens turret unit combination in which the camera and lens turret unit are supported by a pistol grip which is so positioned that the lens-displacing means is operable by the same hand which encloses the pistol grip.

These and other more specific objects will appear upon reading the following specification and claims and upon considering in connection therewith the attached drawings to which they relate and in which:

Figure 1 is a front elevational view of a camera equipped with a lens turret construction embodying the present invention;

Figure 2 is a side elevational view of the construction of Figure 1;

Figure 3:
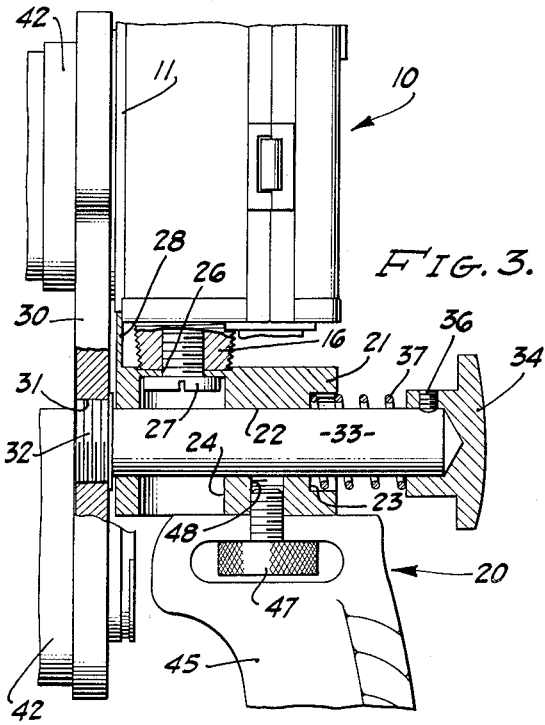
Figure 3 is a partial vertical section upon the line 3—3 of Figure 1 through the supporting body and release means of the lens turret unit.

Referring again to the drawings, a camera is indicated generally by the reference character 10. It is to be understood that this camera is conventional in its details of construction and in its methods and means of operation. These are not of the essence in the present invention, it being important only that the camera incorporates certain more or less standard parts including a front wall or panel 11 having an opening 12 provided with a lens seat 13 secured in any suitable maner. Lens seat 13 preferably has a cylindrical bore, a flat front face or flange 14, and an interior marginal lip 15 extended forwardly of face 14. Camera 10 also has a depending interiorly threaded centrally positioned support post 16 on its underside by which it can be connected to a supporting tripod and incorporates a viewer or range finder unit, indicated generally by the reference character 18, through which the user peers in order to properly align the camera, the internal mechanism of the camera being such that use is made in this connection of the camera lens positioned on seat 13.

Figure 5:
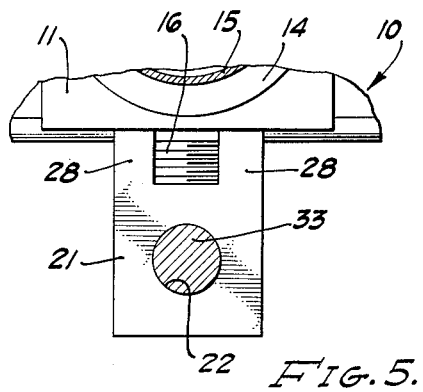
Figure 5 is a view looking in the direction of the arrows upon the line 5—5 of Figure 4.
Figure 4:
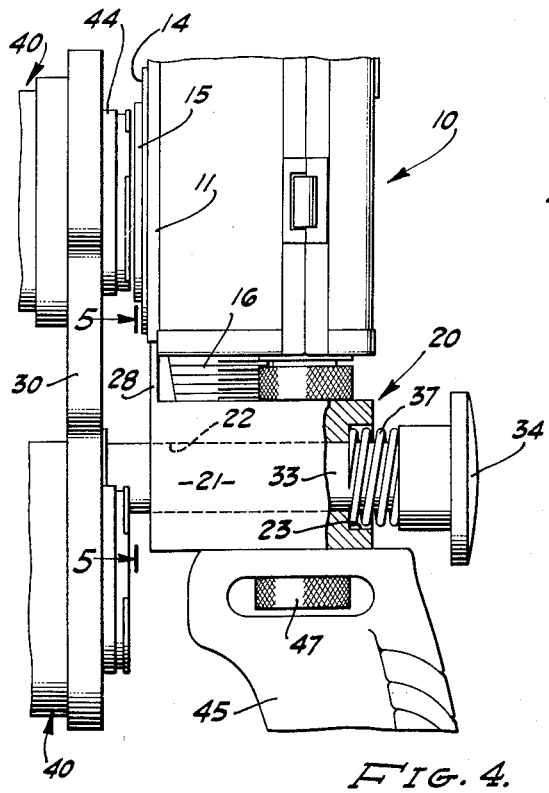
Figure 4 is a view generally similar to Figure 3 but with the release plunger depressed to unseat the operative lens from the camera to enable another lens to be moved into that relationship.

The lens turret unit constructed in accordance with the present invention is indicated generally by the reference character 20 and comprises a body member 21 formed with a horizontal bore 22 which extends between its front and rear sides, being counterbored at 23 at its rearward end, and a second bore 24 extended vertically which interesects horizontal bore 22 and opens through a reduced opening 26 at its upper end to the exterior. A threaded bolt 27 in bore 24 extends through opening 26 and seats the threaded interior of camera post 16 securing the body and the camera together in an accurate alignment which is determined by a pair of vertically extending shoulders 28 at the front end of the body 21 which abut the horizontal lower edge of camera front wall 11. This relationship is shown clearly in Figures 2, 3 and 4 and the shoulders in Figure 5.

A lens turret plate or carrier is indicated by the reference character 30 and is seen to be a flat plate-like member centrally bored and threaded at 31 to seat the threaded end 32 of a shaft 33 rotatably and slidably positioned in the horizontal bore 22 of unit body 21. Shaft 33 extends rearwardly of body 21 and carries at its rearward end a removable cap or head 34 secured in place by a set screw 36. A coil spring 37 encircles shaft 33 and, through abutting the bottom of counterbore 23 and the opposing end of cap 34, exerts a pressure against the latter, and so upon the shaft 33, which at all times draws the turret plate 30 toward the turret body 21, that is, toward the front face 11 of camera 10.

Figure 6:
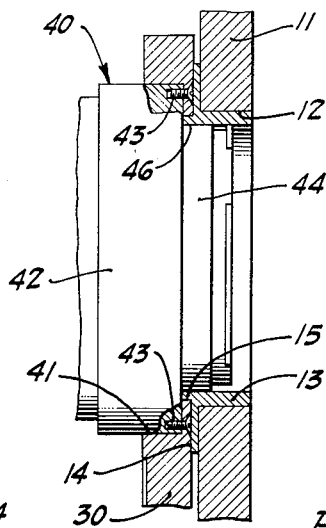
Figure 6 is an enlarged section upon the line 6—6 of Figure 1 and shows the sealed seating relationship of a lens with the camera.

The turret plate or carrier plate 30 carries a plurality of lenses each of which is indicated generally by the reference character 40 and which preferably differ from each other in their optical characteristics. One may be a conventional lens, a second a wide angle lens, and a third a telescopic lens. The kind of lenses is a matter of choice. They are all secured to turret plate 30 and in a manner illustrated in Figure 6 in connection with the lens 40 which is positioned in operative relationship to the camera as illustrated in Figure 1. Turret plate 30 is seen to be formed with a counterbored lens seat 41 in which the rearward end 42 of the lens seats and is retained by a plurality of relatively small screws 43 the heads of which are recessed in the face of plate 30. The lens also includes a reduced diameter rearwardly projecting portion 44 which extends through plate 30 in spaced concentric relationship to form a circular channel 46 and to make a close sliding fit with the circular bore of the lens seat 13. As is clearly seen in Figure 6, the circular lip 15 of lens seat 13 extends into channel 46 and abuts the end portion 42. This relationship, coupled with the inward extension of reduced lens portion 44 into the seat 13, provides a light-tight connection.

In order to effect substitution it is necessary that the operative lens be displaced outwardly from the camera face 11 sufficiently as to enable its reduced rear portion 44 to advance beyond the lip 15 whereupon the plate 30 can be rotated. This is accomplished by moving turret plate 30 forwardly by a force exerted through the shaft 33. It is clear that with the plate 30 so advanced forwardly of the front face 11 of the camera a second lens 40 can be moved into alignment with the lens seat 13 by the rotation of the plate and that the cooperative relationship of the new lens to the camera can be established by the movement of the plate and lens toward the camera.

The construction of the unit of interest is completed by the presence of the pistol grip 45 which is preferably so shaped as to be grasped easily in the palm of the hand of the user leaving the thumb free to extend upwardly therealong. It is to be noted that the rearward edge of the grip 45 is positioned directly below the head or cap 34 on the shaft 33 and in such position that the thumb of the user may contact the head 34 when so extended. Grip 45 is secured to the underside of the body 21 by a knurled headed screw 47 which seats removably in a downwardly opening threaded seat 48 in turret body 21. The screw head is located in a transverse slot in the pistol grip 45 and is exposed at the sides of the grip that it can be rotated either to tighten or to loosen it.

The use and operation of the lens turret unit constructed in accordance with the present invention in cooperation with a camera is believed to be clear from the foregoing. The body 21 of the unit is secured to the mounting post 16 of the camera, the turret-carrying shaft 33 having first been removed as permitted by the removal of its cap 34. With the body 21 in position with its upwardly extending shoulders 28 in firm abutting contact with the lower edge of the front plate 11 of the camera the shaft 33 is advanced longitudinally into its seat 22 in the body 21, the turret plate 30 advancing toward the camera front wall 11. The coil spring 37 is moved into encircling enclosing relationship with the end of the shaft 33 and cap 34 is fixed in position by set screw 36 following which the shaft 33, together with the plate 30 and the lenses 40 carried thereby, are all drawn toward the camera by the action of the spring. The pistol grip 45 may already have been in place on the body 21 but if not it is readily positioned by being advanced into the abutting relationship illustrated in the drawings and upon the rotation of the knurled headed bolt 47 in its threaded seat 48. Let it be assumed that one of the lenses 40 is in operative position relative to the lens seat 13 in the camera wall 11 and the user, upon looking through the view finder 18, recognizes that the telescopic lens is aligned with the camera whereas the wide angle lens is to be preferred. The camera is held in position relative to the eyes by, let us say, the right hand with the pistol grip 45 held in the palm of the hand. With the upwardly extending thumb the user displaces shaft or plunger 33 forwardly against the resilient action of spring 37. The shifting of the shaft moves lens-carrying plate 30 forwardly and away from camera front wall 11 and displaces the reduced end 44 of the lens from within the bore of the lens mounting 13. With the lens end 44 displaced completely and forwardly of the circular lip 15 turret plate 30 is then rotated until the wide angle lens, and specifically its reduced end 44, partially overlies the lip 15 of the lens seat. Manual pressure is then removed from the shaft end cap 34 and the rotation of the turret plate 30 is continued until the lens end 44 is completely aligned with the seat 13 at which time the spring 37 draws it into the seat 13 by the force it exerts through the shaft 33 and plate 30. The relationship of the newly seated lens is then that illustrated in Figure 6, and the entrance of all light into the camera is prevented.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A lens turret unit for photographic cameras of the type having a front wall with a lens seat comprising; a body secured to the underside of said camera body, a rotatable shaft extended slidably through said body and projecting rearwardly therefrom, a turret plate fixed to said shaft carrying a plurality of arcuately spaced lenses so positioned on said plate as to be movable successively into alignment with the lens seat upon the rotation of said plate, spring means acting on said shaft normally urging it rearwardly in said body to move said turret plate toward said camera and a particular lens thereon into engagement with said lens seat with said plate indexed to position said particular lens in alignment with said lens seat, a pistol grip fixed to said body and extended downwardly therefrom below said camera and so positioned relative to said body and to the rearward end of said shaft that with said grip seated in the palm of the user's hand his thumb can extend upwardly into abutting relationship with the rearward end of said shaft to enable the user to exert a force thereon in opposition to said spring to displace said shaft, turret plate and lenses forwardly and from the front wall of the camera and said particular lens from its engagement with said lens seat to enable said turret plate to be rotated to bring another lens into alignement with said lens seat.

2. The lens turret unit defined in claim 1 characterized in that said body of said unit is formed with a transverse bore the ends of which face toward the front and the rear of said camera and which rotatably and slidably seats said shaft to which the turret plate is fixed, and in that said body is formed with a vertical bore having a closed end positioned adjacent the underside of said camera to which it is drawn by a threaded screw extended through said closed end and into said camera and the head of which is positioned in said vertical bore.

3. The lens turret unit defined in claim 1 characterized in that said body is provided with an upwardly extending shoulder which abuts a downwardly facing surface on said camera to insure a predetermined spacing between said body and said camera so that said lenses will move into alignment with said lens seat upon the rotation of said turret plate.

4. The lens turret unit defined in claim 1 characterized in that said body is provided with a pair of spaced upwardly extending shoulders which abut the lower edge of the said front wall of said camera to insure a predetermined alignment between said body and said camera so that said lenses will move into alignment with said lens seat upon the rotation of said turret plate.

5. The lens turret unit defined in claim 1 characterized in that said body of said unit is provided with a downwardly opening threaded bore in addition to said transverse and vertical bores, and in that said pistol grip carries an upwardly extending knurled headed threaded bolt which seats in said threaded bore and draws said pistol grip against said body.

6. The lens turret unit defined in claim 1 characterized in that said slidable and rotatable shaft carries an enlarged end cap adapted to be abutted by the thumb of the user, and in that said spring means acting on said shaft to move said turret plate toward said camera front wall comprises a coil spring encircling said shaft and abutting said body and said enlarged end cap at its own opposite ends.

7. The lens turret unit defined in claim 1 characterized in that said lenses are mounted in light-tight relationship on said turret plate and project therethrough and toward the plane of the front wall of said camera, and in that the lens seat in said front wall is sized closely to enclose and seat the projecting ends of said lenses.

8. The construction recited in claim 7 characterized in that the parts of said lenses projecting through said turret plate are of smaller size than the openings in said turret plate through which they project thereby forming a channel therebetween, and in that said lens seat in said front wall of said camera includes a lip which extends forwardly and is adapted to seat in said channel to provide a light-tight relationship with a seated lens.

No references cited.